United States Patent [19]
Lundsager et al.

[11] 3,904,551
[45] Sept. 9, 1975

[54] PROCESS FOR PREPARING AN AUTO EXHAUST CATALYTIC CONVERTER

[75] Inventors: Christian Bent Lundsager, Ashton; Francis John Sergeys, Kensington, both of Md.

[73] Assignee: W. R. Grace & Co., New York, N.Y.

[22] Filed: Dec. 19, 1973

[21] Appl. No.: 426,349

[52] U.S. Cl...... 252/455 R; 252/477 R; 23/288 FC; 423/213.2; 423/213.5
[51] Int. Cl.².......................................... B01J 35/00
[58] Field of Search.................. 252/477 R, 455 R; 23/288 F, 288 FC; 423/213.2, 213.5

[56] References Cited
UNITED STATES PATENTS
3,755,204  8/1973  Sergeys.......................... 252/477 R Primary Examiner—W. J. Shine
Attorney, Agent, or Firm—Joseph P. Nigon

[57] ABSTRACT

A highly versatile and efficient catalytic converter for internal combustion engine exhaust which includes a porous ceramic monolithic support provided with through holes substantially uniformly throughout a first portion for passing the exhaust in contact with catalyst metal values deposited on walls defining the holes. The support is provided with a second portion wherein similar holes are free of deposited catalyst and adapted to prevent passage of the exhaust. Also disclosed are an installation assembly including the converter and a process for preparing the converter.

4 Claims, 14 Drawing Figures

PROCESS FOR PREPARING AN AUTO EXHAUST CATALYTIC CONVERTER

FIELD OF THE INVENTION

The present invention relates to a highly efficient catalytic converter for converting internal combustion engine exhaust to innocuous entities, an assembly including the catalytic converter as a component thereof, and a process for preparing the converter.

BACKGROUND OF THE INVENTION

The composition of the exhaust from internal combustion engines is characterized by the presence of unburned fuel hydrocarbons, both saturated and unsaturated, carbon monoxide, nitrogen oxides and hydrogen. In addition to these noxious entities, the exhaust of internal combustion engines also contains measurable quantites of water vapor. A typical diesel exhaust also contains partial oxidation products such as organic acids, aldehydes and ketones. These materials may be present in some of the exhaust from other types of internal combustion engines but are typical of the exhaust of diesel motors. In addition, the exhaust from internal combustion engines also frequently contains unburned carbonaceous solids.

The problem of purifying auto exhaust (i.e., exhaust from automobiles, diesels and the like) is a very difficult and complex matter. It is not unusual for temperature in a catalytic converter to reach 1600°F or higher. Thus, exhaust treating catalytic muffler devices are subject to wide variations in temperature over short periods of time. As a result the materials of construction of exhaust treating devices are prone to failure due to thermal stress.

Numerous catalytic converters have been proposed for abatement of pollution resulting from discharge of auto exhaust to the environment. Increased interest has been shown by a variety of interested parties in catalytic converters including monolithic ceramic supports having a wide range of active metal values deposited thereon. See, for example, U.S. Pat. No. 3,755,204 to Sergeys for a description of a process for preparing such catalytic converters from a composition containing a high molecular weight polyolfein, a ceramic filler and a plasticizer. Not entirely satisfactory compositions containing a polyolefin, a filler, and a plasticizer are described in Great Britain Pat. No. 1,044,502 and Australia Pat. No. 277,981.

The aforesaid catalytic converters, referred to herein for simplicity as "monolithic convertors" or by words of like import, have heretofore received limited commercial acceptance due in large part to the limited versatility and high cost thereof, particularly where palladium or platinum is included. Moreover, attempts to effectively prevent exhaust gas from bypassing installed monolithic converters of the prior art have not been entirely satisfactory. These limitations have heretofore been major and unfortunate obstacles to an otherwise promising approach to abatement of auto exhaust pollution, for those skilled in the art have long recognized that many advantages inhere in use of monolithic converters. Accordingly, there is a substantial and long felt need in the art for a monolithic converter having increased versatility which can be prepared more efficiently and at lower cost.

BRIEF DESCRIPTION OF THE INVENTION

It has now been found that a highly versatile, efficient, lower cost catalytic converter for internal combustion engine exhaust can be prepared wherein there is included a porous ceramic monolithic support provided with through holes substantially uniformly throughout a first portion of the support for passing the exhaust in contact with catalytst metal values deposited on walls defining the holes. The support is provided with a second portion wherein similar holes are free of deposited catalyst and are adapted to prevent passage of the exhaust. The invention also provides an installation assembly including the converter and a process for preparing the converter.

Generally stated, the present process includes
a. preparing a non-fired ceramic structure having a plurality of through holes substantially throughout, said holes being defined by a network of walls of the structure,
b. sealing preselected ones of the through holes in the green or non-fired structure to substantially prevent passage of exhaust through the sealed holes and to render the walls defining said sealed holes substantially non-available for contact by coating media external to the holes, the sealing being effected by contacting one or more ends of each wall defining a through hole selected for sealing with sealing means at a temperature effective for thermoplastically deforming and fusing the one or more ends;
c. firing to sinter the ceramic structure from step b.; and
d. coating available surfaces of the sintered ceramic structure with metal values exhibiting catalytic activity for converting engine exhaust gases and heating to activate the metal values.

BRIEF DESCRIPTION OF THE DRAWING

In the accompanying drawing, wherein like numerals refer to similar elements throughout.

DETAILED DESCRIPTION OF THE INVENTION

Figure 1:
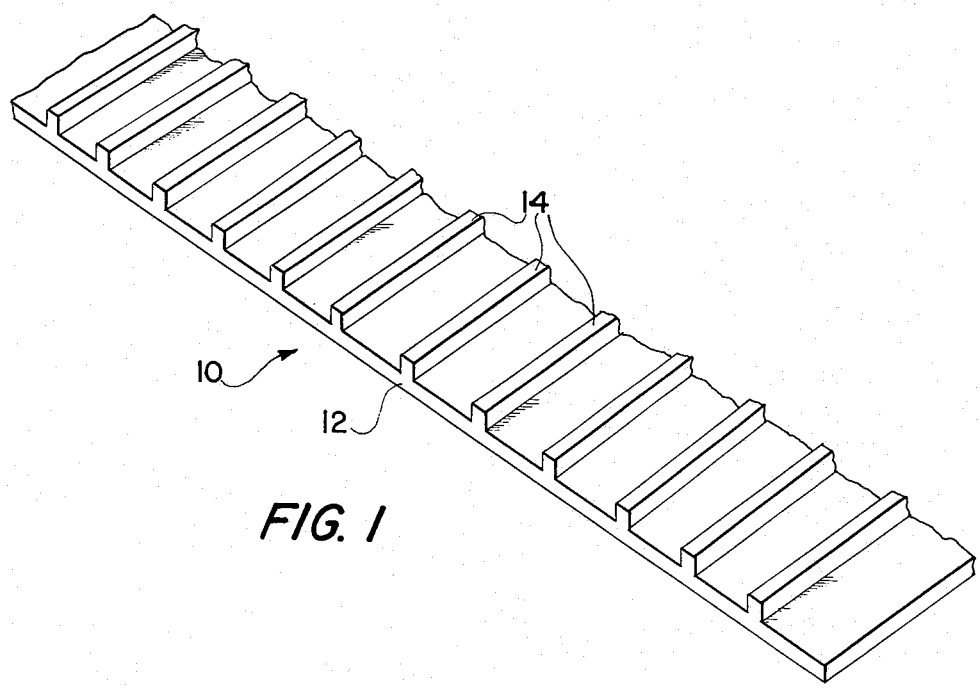
FIG. 1 is a perspective view illustrating part of a rib-bearing plastic ceramic layer from which the present monolithic support component may be prepared.

While almost any of the plastic compositions and porous ceramic monolithic structures described in U.S. Pat. No. 3,755,204 may effectively be used in the present invention, this description is given with principal reference to the plastic compositions and porous ceramic monolithic structures described herein. The reader is referred to the last cited patent for further description of matters relevant to the present invention but not essential to understanding practice thereof.

The monolithic ceramic support component of the catalytic converter of the present invention is preferably prepared from a plastic composition comprising a finely divided ceramic component, a polyolefin component, and a plasticizer component, each of which is an essential component of the mixture.

The polyolefin component of the plastic composition, which may be a mixture, may be almost any high molecular weight polyolefin having a standard load melt index of substantially 0. As used herein with reference to polyolefins the term "high molecular weight" means a molecular weight of at least 150,000. The polyolefin component may be a HMW (i.e., high molecular weight) polyolefin selected from the group consisting of high molecular weight particleform high density (0.93–0.97) polyethylene, high molecular weight low density polyethylene, high molecular weight polypropylene, and high molecular weight polypropylene, and high molecular weight particle form ethylene-butylene copolymer.

A polyolefin preferred herein in commercial particle form high molecular weight polyethylene, having a standard load (2,160, g.) melt index of 0.0, a high load (21,600 g.) melt index of 1.8, a density of 0.95, and a Viscosity of 4.0 measured as 0.02 gram of polymer in 100 g. decalin at 130°C. This polymer can be prepared by the method given in U.S. Pat. No. 2,825,721 using an ammonium fluoride treated chromium oxide catalyst.

Suitable blends of HMW polyolefins and LMW (i.e., low molecular weight) polyolefins may be included as the polyolefin component, provided that the average molecular weight is not so low as to result in unacceptably brittle compositions.

The finely divided ceramic component may be of almost any ceramic material which when fired in finely divided form, e.g. powder, sinters to an integral structure in or on which catalyst materials active for converting exhaust can be deposited. Deposition of materials activatable to conversion active states followed by such activation, as may be required, is also within the scope of the present invention. Suitable ceramic materials include, for example, alumina, spodumene ($LiO_2 \cdot Al_2O_3 \cdot 4SiO_2$), mullite ($3Al_2O_3 \cdot 4SiO_2$), zircon mullite, magnesia-alumina, spinel, cordierite ($2MgO \cdot 2Al_2O_3 \cdot 5SiO_2$) and aluminum titanate. Cordierite is generally preferred.

The plasticizer component may be almost any of numerous suitable plasticizers, including mixtures thereof. A number of suitable water soluble plasticizers are set forth below:

a. glycol, glycol ethers and esters
b. glycerin, glycerol monoacetate, etc.
c. diethylene glycol, diethylene glycol ethers and esters, triethylene glycol, etc.
d. polyethylene glycols (molecular weight range 400 to 20,000)
e. propylene glycol, dipropylene glycol
f. polypropylene glycol (molecular weight range 260 to 1,200)
g. trimethylene glycol, tetramethylene glycol, 2,3-butylene glycol, etc.
h. alkyl phosphates (e.g., triethyl phosphate)
i. water soluble polymeric materials, such as polyvinyl alcohol, partially hydrolyzed polyvinyl acetate, polyacrylic acid, and polyvinyl pyrrolidone.

Mixtures of water soluble plasticizers and organic solvent soluble plasticizers may be included.

A number of suitable organic solvent soluble plasticizers are set forth below:

a. chlorinated hydrocarbons
b. miscellaneous plasticizers — sulfonamide, coumarone-indene, asphalt, etc.
c. hydrocarbons — paraffin oil, low polymers such as polyisobutylene and polybutadiene.

The plasticizer is preferably selected from the group consisting of mineral oil, diethylene glycol, propylene glycol, dipropylene glycol, glycerin, glycerol monoacetate, trimethylene glycol, tetramethylene glycol, 2,3-butylene glycol, triethyl phosphate, polyvinyl alcohol, and polyvinyl pyrrolidone.

The components of the composition can be included in the following amounts suitable for providing a workable plastic composition: polyolefin 5 – 70% by volume, plasticizer 15 – 80% by volume, and ceramic filler 15 – 80% by volume; or polyolefin 5 – 70% by weight, plasticizer 10 – 70% by weight, and ceramic filler 20 – 90% by weight. The preferred ranges are polyolefin 5 – 50% by volume, plasticizer 20 – 60% by volume, and filler 20 – 50% by volume.

The plastic composition may be prepared in any suitable manner, a number of which are disclosed in U.S. Pat. No. 3,755,204. For example, the various essential components, with or without suitable additives, may be pre-mixed at room temperature in a dough mixer. The resulting dough or powder may be further mixed to a substantially uniform mixture using a plastograph.

Conveniently, the monolithic ceramic component of the present catalytic converter may be prepared from the plastic composition as next described. A mixture of the components of the plastic composition is compounded by heating to from about 300°F to about 550°F with working until a uniform composition results. Thereafter the composition is extruded and shaped to form a flat sheet having a series of ribs thereon as illustrated in FIG. 1 of the drawing by sheet portion 10 having a generally flat undersurface, shown by edge 12 thereof, and opposite thereto a plurality of generally flat top ribs 14, which preferably are in generally parallel relationship each to others. Extruding and shaping to form the ribbed sheet may be carried out using known techniques therefor. Conveniently, the plastic mixture may be extruded using a screw extruder equipped with a sheet-forming die and having a 20:1 length to diameter ratio and 3:1 compression ratio. The sheet may be extruded at a temperature of from about 300°F to about 500°F in a thickness of from about 10 to about 75 mils and a width of from about 4 to about 40 inches. Ribs may be formed by passing the extruded sheet while still hot through the nip of a pair of pinch rolls, one of which is provided with axially parallel grooves generally corresponding in size and shape to the desired size and shape of the ribs.

Figure 2:
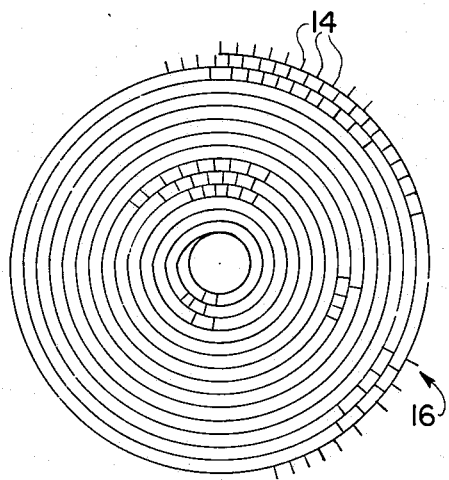
FIG. 2 schematically illustrates a rib-bearing plastic ceramic layer taken up on a roll.
Figure 3:
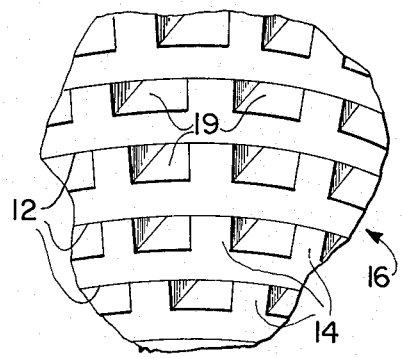
FIG. 3 is a partial perspective view illustrating through holes and walls defining the holes in an embodiment catalytic converter of the present invention.

The ribbed sheet is next formed to a layered structure as by winding or taking up the sheet about a roll such that the ribs are generally parallel to the roll axis with the rib tops in contact with the undersurface of adjacently wound sheet sections. The resulting structure is illustrated in FIG. 2 and, in greater detail, in FIG. 3 by radially layered structure 16.

The ribs are heat sealed or bonded to undersurfaces with which rib top contact is being made, as by winding, by heating to a seal-effecting temperature. Bonding of the rib tops to the undersurfaces may conveniently be effected by contacting the ribbed sheet with a fluid heating medium at a temperature and for a time effective for heat softening the surfaces contacted by the medium, winding the sheet about itself to contact the heat-softened rib tops with the heat-softened undersurfaces of now adjacent layers or portions of the wound sheet, and permitting the contacting surfaces to bond or fuse together substantially throughout. The heating medium may be at a temperature of from about 180°C to about 1200°C, and preferably from about 500°C to about 1000°C. The time of contact with the heating medium is such as to permit surface bonding without destroying the dimensional stability of the structure, as may occur if the interior of the structure is heated to above its melting point. In general, the time of contact with the heating medium may be from about 0.05 to about 5 seconds. The heating medium may be, for example, air or other gaseous media such as gaseous products of combustion of natural gas, etc. Satisfactory bonding may be effected, for example, using a gaseous heating medium at a temperature of about 1000°–1250°C with a heating media contact time of about 0.5 to 2 seconds. Typically, the corresponding ribbed sheet surface temperature is approximately 180°C to 260°C, e.g. about 200°C. While heat sealing and winding may be performed in any order, conveniently sealing is effected by winding the ribbed sheet while the undersurfaces and rib tops being contacted are at a sealing temperature.

Figure 4:
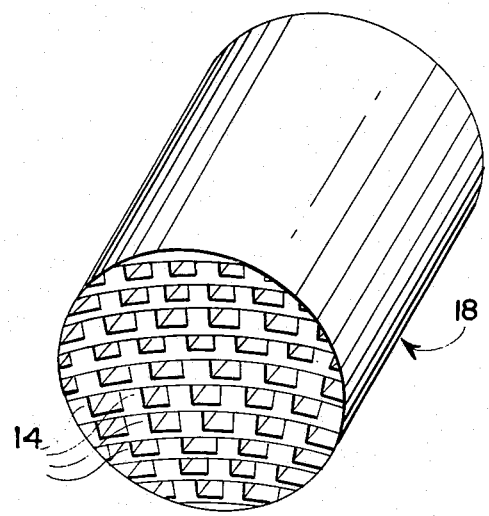
FIG. 4 is an overall perspective view illustrating a monolithic structure cut from a rolled rib-bearing plastic ceramic layer and schematically showing through holes uniformly distributed throughout.

Next, monolithic substrate 18 (FIG. 4) having a desired shape, which may be generally cylindrical as shown, is cut from the bonded radially layered structure 16 and at least a substantial fraction of the plasticizer is extracted. While extraction and cutting may be performed concurrently or in any suitable sequence, extraction preferably is effected after cutting. Extraction can be accomplished by any solvent in which the plasticizer is soluble. For example, when using a plasticizer such as mineral oil, hexane is a suitable solvent. When a water soluble plasticizer such as diethylene glycol is used, water is a suitable solvent. The removal of the plasticizer results in the formation of a microporous structure.

Extraction provides microporosity to the structure, thereby aiding in increasing efficiency of catalyst converters including the ultimately prepared monoliths as components thereof.

Sealing of selected through holes is effected as next described. Sealing of the holes may be performed before, after, or simultaneously with cutting.

Selected ones of the through holes (shown by holes 19 in FIG. 3) are sealed such that passage of exhaust therethrough is substantially prevented and such that the surfaces defining said sealed holes are nonavailable for contact by coating media external to said holes.

Sealing may be effected in any suitable manner. For example, finely divided sinterable ceramic material may be added in amounts sufficient to fill the selected holes or at least one end of each such hole and thereafter fired to fuse the added ceramic material to a solid essentially non-porous ceramic structure, thereby rendering the filled holes essentially non-available for contact from without. Another suitable hole sealing technique is to plug opposite ends of the holes with a paste or viscous slip or slurry containing a high concentration of finely divided ceramic material and thereafter heating to remove the liquid carrier or suspension media in vapor form and sintering to fuse the ceramic material to solid essentially non-porous plug structures which seal or plug the holes, thereby rendering the hole defining surfaces substantially inaccessible from without.

In a preferred aspect of the present invention, sealing is effected by heating at least one end of each wall or surface defining a hole selected for sealing to a temperature at least equal to the fusion temperature of the walls (e.g., from about 350° to about 500°F), thermoplastically deforming the walls while at or above the fusion temperature to fuse the walls to hole sealing configurations, and thereafter cooling. Sealing deformation may conveniently be aided by application of suitable pressure using well known pressuring techniques.

Sealing may thus be effected by contacting one or more ends of each surface defining a through hole selected for sealing with sealing means at a temperature effective for thermoplastically deforming and fusing said one or more ends. The sealing means may be a heated metal surface or the like. Generally better sealing results by effecting relative motion between a contact surface of the sealing means and surfaces of the one or more ends during the period of contact.

Selection of holes to be sealed is generally made such that the sealed holes include most or all holes through which exhaust flow is essentially prevented when a converter including the monolith support as a component thereof is assembled with means for supporting the converter in an exhaust conduit.

Where only one end of one or more selected holes is sealed, it is preferred that hole ends at or near a common end of the monolith being prepared are sealed. Preferably, the selected holes are sealed at each opposite end thereof.

Figure 5:
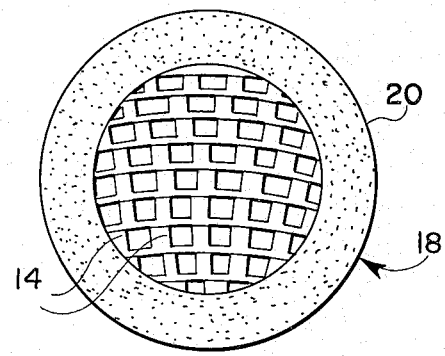
FIG. 5 is an end view illustrating a monolithic support having its through holes sealed in a selected region for use as a component of an embodiment catalytic converter of this invention.

In an embodiment illustrated in end view in FIG. 5, generally cylindrical monolith 18 is provided with sealed holes in annular region 20 the outer radial extent of which may coincide with the cylindrical periphery as shown. However, it is understood that the present highly versatile monolith may be sealed in regions of almost any configuration, thereby being readily adaptable for use in a variety of converter assemblies.

Figure 6:
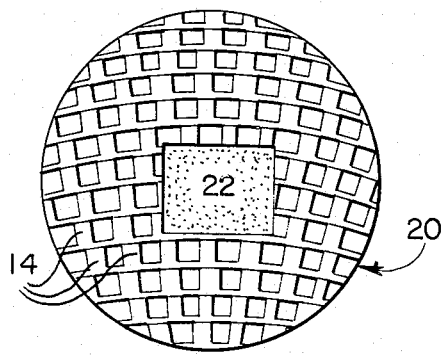
FIG. 6, FIG. 7 and FIG. 8 illustrate in end views other selectively sealed monoliths for use in other embodiment catalytic converters of the present invention.
Figure 7:
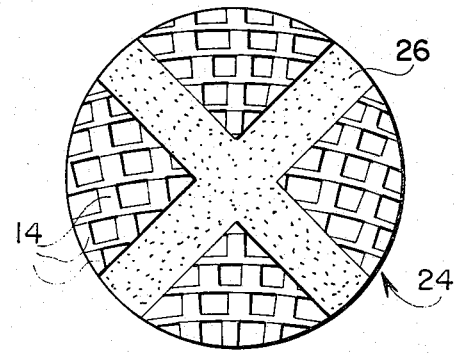
Figure 8:
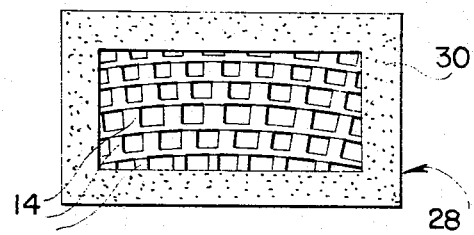

Other useful embodiment monoliths of the present invention include generally cylindrical monolith 20 (FIG. 6) having the holes in medial region 22 thereof sealed, generally circular section monolith 24 (FIG. 7) having the holes in X-shape region 26 sealed off, and generally rectangular monolith 28 (FIG. 8) having the holes in peripheral region 30 thereof sealed off.

Figure 9:
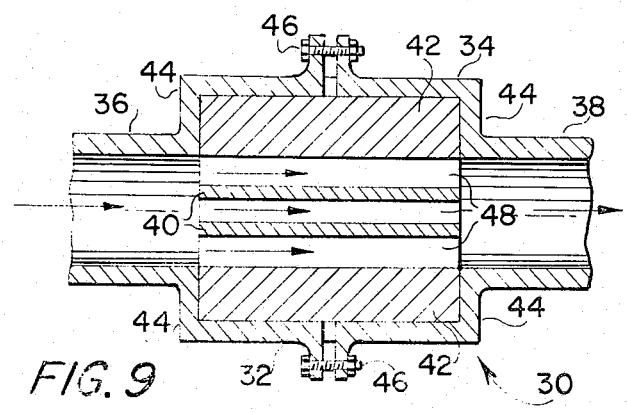
FIG. 9 is a section view illustrating an installation assembly including an embodiment of the present catalytic converter as a component thereof.

FIG. 9 illustrates assembly 30 formed of a catalytic converter including ceramic monolithic support 40 disposed in housing means including coupled first and second flanged housings 32 and 34 which may be integrally formed with conduits at opposite ends for passing exhaust as indicated by the arrows. Shoulders 44 provided on the housings for securing the catalytic converter in place essentially prevent flow through peripheral zones 42, 42 of the converter and accordingly the holes in these zones have been sealed substantially as above described.

The amount of catalyst metal values required to coat the through hole walls in the converter is thus substantially reduced, permitting use thereof at substantial savings in cost, which savings increase with increased cost of the metal values, e.g., platinum and palladium, included in the converter.

After sealing the selected holes, the monolithic substrate being formed is heated to from about 240°C to about 700°C to burn off the polyolefin, followed by sintering at a temperature of from about 1300°C to about 1450°C for preferably from about 2 to about 6 hours to fuse the finely divided ceramic component to a rigid microporous monolithic ceramic structure having holes therethrough. After cooling, preferably to room temperature (i.e., about 25°C) which may require up to about 4 hours, the monolithic support is recovered.

After firing, available surfaces of the present monolithic porous ceramic support components are provided with a coating of suitable metal values for exhaust conversion.

Any suitable catalyst or mixture thereof active for converting internal combustion engine exhaust may be deposited in or on the available surfaces of the monolithic support using any suitable deposition technique therefor. Numerous such catalysts and deposition methods are well known in the art. See for example, U.S. Pat. Nos. 3,288,558; 3,295,918; 3,304,150; 3,322,491; 3,338,666; 3,346,328; 3,455,843; 3,470,105; and 3,755,204. These catalytic compositions include the following catalytic components in percentages by weight of the total catalyst structure.

Catalyst 1 Catalytic Components — 10% CuO, 4.0% $Cr_2O_3$, 0.02% Pd.

Catalyst 2 Catalytic Components — 8% CuO, 12.0% $MnO_2$, 0.02% Pd.

Catalyst 3 Catalytic Components — 4% CuO, 6% $MnO_2$, 4% $Cr_2O_3$, 0.02% Pd.

Of course, other catalytic compositions are also useful.

A particularly suitable method of impregnating these catalytic components onto the porous material is that described in U.S. Pat. No. 3,455,843 wherein the copper-palladium is impregnated into the porous structure by means of a copper-palladium solution followed by impregnation with the chromia ($Cr_2O_3$) by vacuum impregnation (Catalyst 1). The components of Catalyst 2 are therein impregnated into the porous structure by immersing the structure in a copper-manganese-palladium salt solution. When this is followed by impregnation with the chromia by vacuum impregnation, a porous ceramic structure containing the catalytic components of Catalyst 3 was thereby prepared.

It is critical that the sealing step precede the firing step in the present process. Attempted deformation sealing on fired ceramic monolithic structures almost invariably fails to effect sealing and rarely effects suitable compaction.

Figure 11:
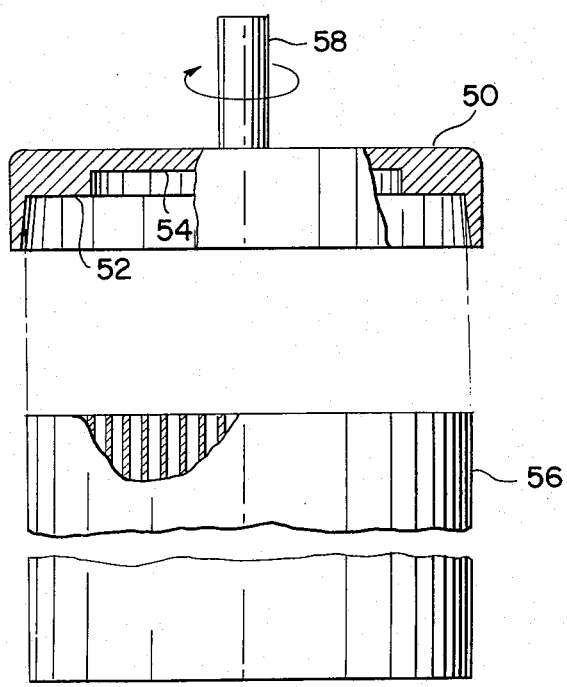
FIG. 11 illustrates an arrangement for effecting sealing after cutting in the process.

A suitable arrangement for effecting sealing in an annular periphal region of non-fired cylindrical ceramic monolithic support component 56 is shown in FIG. 11. Therein is illustrated a sealing step wherein rotatable circular tool 50 having annular surface 52 disposed generally about circular recess 54 is operatively contacted with an end of the monolith. The tool, which is provided with a wear resistant surface is rotated about the axis of shaft 58 while annular surface 52 is in contact with an outer annular end region of the monolith. Sufficient pressure is applied to maintain contact of the tool with the monolith and to effect plastic deformation of the contacted monolith region with end sealing of the holes therein. Sufficient friction accompanies rotation to suitably heat soften the contacted end of the monolith. Continuing rotation for a suitable period of time is usually found to provide the resulting sealed hole containing end region with a substantially smooth surface effective for forming a substantially gas tight seal in cooperation with surfaces of containers with which the catalytic converter may be assembled for use.

Figure 14:
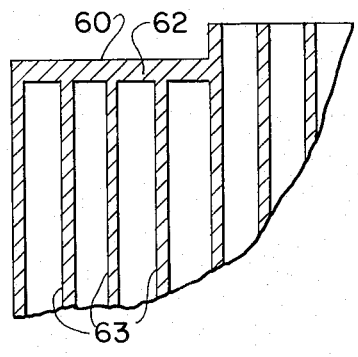
FIG. 14 is a partial sectional elevation view illustrating a monolithic support having a portion with sealed through holes recessed.

Advantageously, the contacted annular end portion of the monolith may be recessed as shown by recess 60 (FIG. 14) by advancing a rotating sealing means as illustrated by tool 50 from the contacted end of the monolith toward the opposite end thereof. Advancement for a suitable extent is found to compact the recessed end portion to form sealed hole end region 62 (FIG. 14) having higher strength and density, thereby further increasing commercial attractiveness of the monolith.

Figure 10:
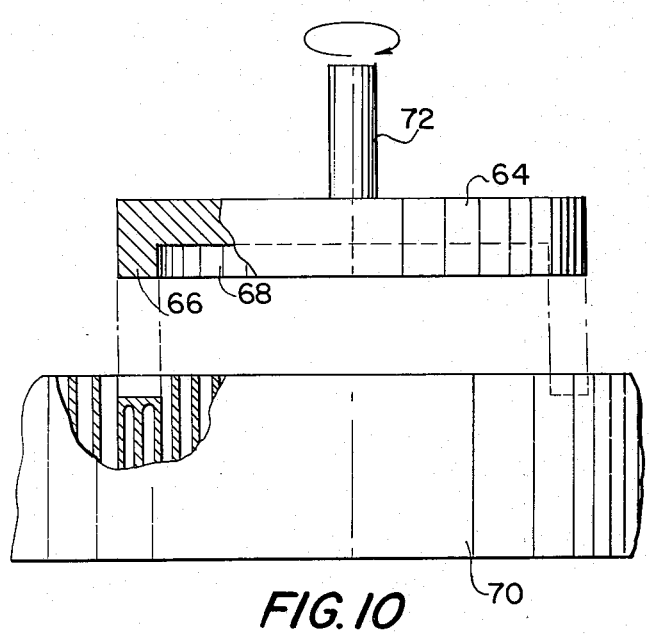
FIG. 10 illustrates an arrangement for effecting sealing prior to cutting in the present process.

Hole-sealing conveniently may be effected prior to cutting using an arrangement illustrated in FIG. 10, wherein tool 64 provided with seal-effecting annular surface 66 disposed generally about the periphery of circular recess 68 is shown in near operative engagement with an end of radially layered structure 70 which is substantially the same as structure 16 (shown in FIG. 2). The arrangement is shown after a sealed annular recessed area corresponding to surface 66 has been formed in the monolithic structure. Tool 64 is operated substantially according to the above description given with reference to tool 50, and may be operated to recess or compact and recess the contacted area as desired. After sealing an annular hole-containing area, a generally cylindrical monolith is cut as by using a spinning die cutter to remove a monolith having its hole ends sealed in an annular zone terminating outwardly to the periphery of the monolith, as illustrated in FIG. 5.

Figure 12:
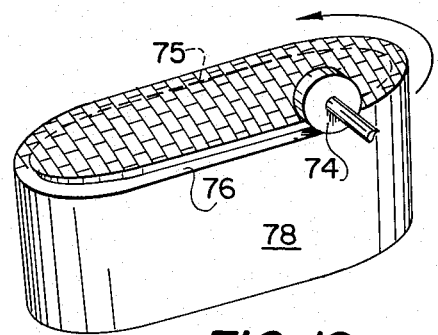
FIG. 12 illustrates another arrangement for effecting sealing after cutting.

Another seal effecting arrangement is shown in FIG. 12 by roller 74 which may be advanced about, and in contact with, peripheral region 76 of non-fird monolith 78 which may be generally oval as illustrated or of other suitable shape. Broken line 75 illustrates the inner edge of the region being sealed.

Figure 13:
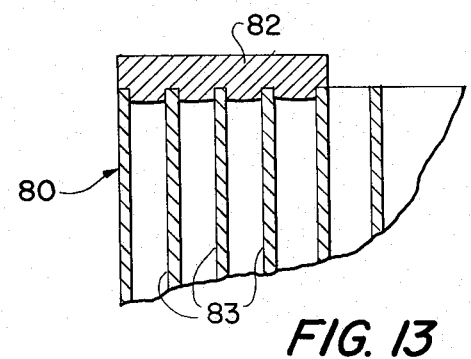
FIG. 13 is a partial sectional elevation view illustrating a monolithic support having a portion with open through holes recessed.

The monolithic support component may be provided with an end having a portion with open through holes in recessed relationship to a portion having sealed holes as illustrated by monolith 80 having hole-defining walls 83 and raised sealedhole region 82 as shown in partial section in FIG. 13. Monolith 80 may be prepared as described above in connection with using added ceramic material in sealing selected through holes thereof.

The present monolith ceramic support component may suitably be characterized by substantially uniform ribbed layers wherein:

a. the distance from the undersurface of a layer to the top of the ribs thereof is from about 10 to about 100 mils,
b. the thickness of the layer in the region between the ribs is from about 8 to about 90 mils,
c. the distance between adjacent ribs is from about 10 to about 100 mils,
d. in sections taken perpendicular to the longitudinal extent of the through holes, the area of the through holes is from about 50 to about 90 percent of the overall area of the monolithic ceramic support, and the ribs are generally rectangular in such section;
e. the average pore diameter is from about 1 to about 10 microns, and
f. the pore volume is from about 20 to about 60 percent of the overall volume (i.e., including pore volume) of the ribbed layers.

The invention is further illustrated by the following specific, but non-limiting example. All parts and percentages given throughout this description are by weight unless indicated otherwise.

A composition was prepared by admixing 8.6 grams of particle from polyethylene, 76.8 grams of cordierite and 28.8 grams of a mineral oil containing approximately 80% saturates. The components were mixed in a commercially available Brabender Plastograph heated to 170°C. The composition was extruded and pressed into 12 mil sheets in a hydraulic press with 20 tons force.

Ribs about 12 mils wide, 50 mils high and spaced 1/16 inch apart were provided on the sheet using a pair of pinch rolls, one of which was provided with grooves corresponding to the ribs. The ribbed sheet was rolled up about a mandrel with the ribs protruding radially from the top of the layered structure and extending in parallel relationship with the roll. The resulting structure having about 270 holes per square inch therethrough and appearing as shown generally in FIG. 2 was heat sealed by heating to temperatures of about 200°C. The heat-sealed structure was then cooled and immersed in hexane for 30 minutes to extract substantially all the mineral oil.

A cylindrical structure about 5 inches in both diameter and length with the holes extending in generally parallel relationship with the axis was cut from the extracted roll. Sealed holes were provided in an annular peripheral region about ¼ inch in radial thickness substantially as illustrated in FIG. 5 by heat softening the ends of the region and applying pressure to the heated ends using a rotating tool substantially as illustrated in FIG. 1. The tool was advanced toward the opposite end to a recess depth of about 1/16 inch.

The resulting partially sealed structure was heated in a free oxygen containing atmosphere, first to about 250°C (over a period of 3 hours). When degradation began as evidenced by the black color of the structure, the temperature was slowly increased and about 2 hours later at about 700°C the structure turned white indicating that burn off of the polyethylene was complete. The temperature was slowly increased and about 2 hours later the temperature reached 1450°C where it was held for about 2 hours to sinter the remaining ceramic powder. The structure was cooled over a period of about 4 hours.

Next, the structure was impregnated in the available surface thereof with solutions of the soluble salts of chromium, manganese, copper and palladium to provide a final catalytic composition of 4.64 percent $Cr_2O_3$, 6.96 percent $MnO_2$, 4.64 percent CuO, and 0.02 percent Pd using well known impregnation techniques.

It is to be understood that the foregoing detailed description is given merely by way of illustration and that numerous modifications may be made therein without departing from the spirit or scope of the present invention.

What is claimed is:

1. A process for preparing an engine exhaust catalytic converter having a portion adapted to pass the exhaust and a portion adapted to substantially prevent passage of the exhaust, which comprises:

a. homogeneously blending a composition consisting essentially of 5-70 volume percent of a polyolefin having a molecular weight of at least 150,000 and a standard load melt index of substantially zero; 15-80 volume percent of a ceramic filler selected from the group consisting of alumina, mullite, zircon mullite, magnesium aluminate spinel, and cordierite, and 15-80 volume percent of a plasticizer selected from the group consisting of mineral oil, diethylene glycol, propylene glycol, dipropylene glycol, glycerin, glycerol monoacetate, trimethylene glycol, tetramethylene glycol, 2,3-butylene glycol, triethyl phosphate, polyvinyl alcohol, and polyvinyl pyrrolidone;

b. molding said composition at a temperature of about 300° to 550°F. to form a plastic sheet having ribs in substantially uniformly spaced relation thereon;

c. rolling said plastic sheet about itself so that free ends of said ribs contact said sheet and heating the sheet surface to fuse the contacting areas together thermoplastically and to provide a plastic ceramic structure having a plurality of through holes substantially throughout, said holes being defined by oppositely facing walls of adjacent ribs, first sheet surfaces facing intermediate fused areas of said adjacent ribs, and second sheet surfaces facing said first sheet surfaces;

d. cutting the plastic structure to remove a section thereof having a preselected size and shape and having a plurality of through holes substantially throughout and substantially as defined above;

e. extracting said plasticizer from the section with water or an organic solvent;

f. sealing the through holes in the periphery of said structure section to substantially prevent passage of exhaust through the sealed holes and to render the surfaces defining said sealed holes substantially non-available for contact by coating media external to said holes;

g. heating the resulting ceramic structure to about 240° to 700°C. to burn off the polyolefin component and increase the porosity of the structure;

h. firing the porous ceramic structure at a temperature of from about 1300° to about 1450°C. for a time sufficient to sinter said porous ceramic structure; and i. impregnating the porous ceramic structure with solutions of soluble salts of metals exhibiting catalytic activity for converting engine exhaust gases and heating to convert the metals to the active form.

2. The process of claim 1 wherein said starting composition contains from 5–50 volume percent polyolefin, 20–50 volume percent filler and 20–60 volume percent plasticizer.

3. The process of claim 1 wherein said polyolefin is selected from the group consisting of polyethylene, ethylenebutylene copolymer, and polypropylene; the plasticizer is mineral oil; and the plasticizer is removed by contacting the fused structure with hexane.

4. The process of claim 1 wherein said contacting step is effected before the extraction step.

* * * * *